US007006093B2

(12) United States Patent
Fujiwara et al.

(10) Patent No.: US 7,006,093 B2
(45) Date of Patent: Feb. 28, 2006

(54) METHOD AND SYSTEM FOR PROCESSING A THREE-DIMENSIONAL SHAPE DATA

(75) Inventors: Koichi Fujiwara, Otsu (JP); Osamu Toyama, Kakogawa (JP); Eiro Fujii, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 701 days.

(21) Appl. No.: 09/749,624

(22) Filed: Dec. 28, 2000

(65) Prior Publication Data

US 2001/0013874 A1 Aug. 16, 2001

(30) Foreign Application Priority Data

Dec. 28, 1999 (JP) .................................. 11-372356

(51) Int. Cl.
*G06T 11/20* (2006.01)
(52) U.S. Cl. ...................... 345/441; 345/619; 345/620; 345/629; 345/630; 345/442; 345/626
(58) Field of Classification Search ............... 345/619, 345/441, 442, 420, 630, 647, 620, 629, 631
See application file for complete search history.

(56) References Cited

U.S. PATENT DOCUMENTS 5,731,816 A * 3/1998 Stewart et al. .............. 345/419

6,337,685 B1 * 1/2002 Nagakura ................... 345/419
6,456,287 B1 * 9/2002 Kamen et al. .............. 345/427

FOREIGN PATENT DOCUMENTS

| JP | 9-161087 | 6/1997 |
|---|---|---|
| JP | 11-15994 | 1/1999 |
| JP | 11-134517 | 5/1999 |
| JP | 11-134518 | 5/1999 |
| JP | 2000-3446 | 1/2000 |

OTHER PUBLICATIONS

Harovas et al., MAYA complete Jan. 2, 2000, SYBEX, pp. 184-186.*

* cited by examiner

Primary Examiner—Kimbinh T. Nguyen
(74) Attorney, Agent, or Firm—McDermott Will & Emery LLP

(57) ABSTRACT

The steps of obtaining three-dimensional shape data representing a three-dimensional shape model, designating a portion required to be corrected of the three-dimensional shape model, displaying a surface to be joined to the designated portion, modifying a shape of the surface corresponding to a change of a designated parameter of the surface, and re-displaying the modified surface are provided. Filling of a lack portion of a part of the tree-dimensional shape model is achieved by an easy input operation.

19 Claims, 4 Drawing Sheets

■ BOUNDARY VALUE
● KNOWN DATA
○ UNKNOWN DATA

METHOD AND SYSTEM FOR PROCESSING A THREE-DIMENSIONAL SHAPE DATA

This application is based on Japanese Patent Application No. 372356/1999 filed on Dec. 28, 1999, the contents of which are hereby incorporated by reference.

BACKGROUND OF THE INVENTION

1. Field of the Invention

The present invention relates to a method and a system for processing a three-dimensional shape data.

2. Description of Prior Art

Conventionally, modeling which utilizes a three-dimensional measuring apparatus is performed. For example, a three-dimensional measuring apparatus using a light-section method, scans optically an object by projecting and deflecting a slit light and calculates a three-dimensional shape data by applying a principle of a triangular surveying. Such measurement is performed around the object, a plurality of the obtained three-dimensional shape data are connected together, so as to obtain the shape model for the object as a whole.

Because of the measuring conditions, such as shape or direction of an object, or lighting, the three-dimensional shape data sometimes cannot be obtained perfectly, the lack of the data may occur. In this case, the filling of the lack part, namely the data correction of the three-dimensional shape data is performed.

Conventionally, as a method for filling the portion with lack of data, the method of using a grid as a fundamental model, generating a new curved surface by transforming the grid, and connecting the generated surface with the outline of the portion with lack of data is provided. The unexamined Japanese patent publication No. 11-15994 discloses a computer system in which an operator can adjust the curved surface by trial and error with monitoring the result so as to make the filling natural. In this system, by designating at least one point inside the curved surface and a target position, the curved surface is automatically modified to be smooth surface including the target position, automatically, and the numerical data representing the change of the shape is displayed. The operator evaluates the modification by the numerical data, if the operator is not satisfied with the result, then he or she designates again a point inside the curved surface and a target position.

Conventionally, there is a problem that the operator must designate a large number of values for adjusting the curved surface to be added to the shape model and the data correction operation of the shape model is troublesome. Especially, if the shape model has a complex surface with ups and downs, the operator must designate many points, therefore the load on the operator is heavy.

SUMMARY OF THE INVENTION

The object of the present invention is to provide a method and system for adding a required curved surface to a portion of the shape model by a simple and easy input operation.

According to an aspect of the present invention, a method comprises the steps of obtaining three-dimensional shape data representing a three-dimensional shape model, designating a portion of the three-dimensional shape model required to be corrected, displaying a surface to be joined to the designated portion, modifying a shape of the surface corresponding to an alteration of a parameter, and re-displaying the modified surface in response to the reception of alteration.

According to another aspect of the present invention, a method comprises the steps of displaying a three-dimensional shape model and a surface to be joined to the three-dimensional shape model, the shape of the surface is defined by at least one parameter, obtaining only one value of the parameter, and modifying the displayed surface based on the obtained value of the parameter.

The other objects and features of the present invention will be more fully understood from the following detailed description with reference to the accompanying drawings.

DETAILED DESCRIPTION OF THE INVENTION

Figure 1:
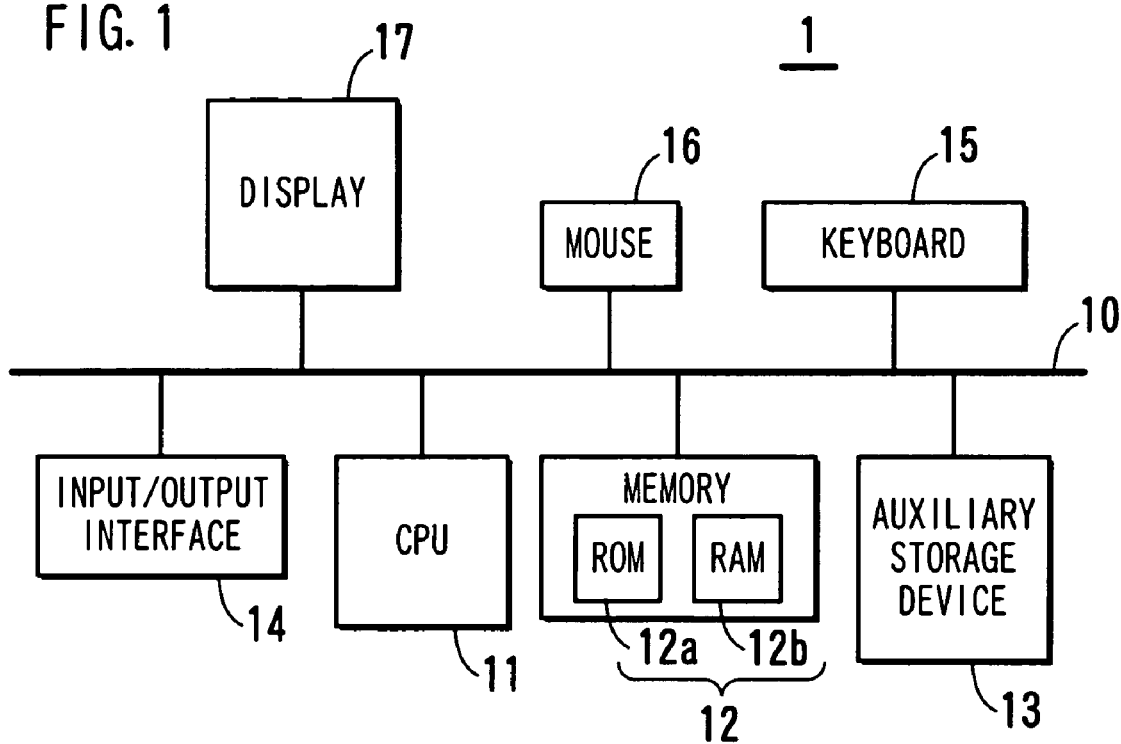
FIG. 1 is a block diagram showing a three-dimensional processing apparatus according to an embodiment of the present invention.

FIG. 1 is a block diagram showing a configuration of a three-dimensional processing system of an embodiment according to the present invention.

Referring to FIG. 1, the three-dimensional processing system 1 is a computer system which comprises a bus 10, a CPU (central processing unit) 11, a memory 12, an auxiliary storage device 13, an input/output interface 14, a keyboard 15, a mouse 16, and a display 17.

The CPU 11 executes various processes including a data modification according to the present invention. The memory 12 includes a ROM 12a for storing a control program in which a sequence executed by the CPU 11 is scripted, and a RAM 12b providing a data storage area and a working area required for the execution of the various processes by the CPU 11. The auxiliary storage device 13 is used for storing an objective data such as a three-dimensional data (shape data), a two-dimensional color image data, and so forth. The input/output interface 14 is used for inputting an objective data from the external of the device or for outputting a generated data to the external of the device.

The keyboard 15 and the mouse 16 are used for inputting various instructions or settings. The display 17 displays images of three-dimensional data and the generated surface, and also is used for displaying a processing status, a processed result, and a progressing status. The display 17 can display a plurality of windows by a multi-window system.

By using the three-dimensional processing system 1, a required curved surface data can be added to a three-dimensional data which is either inputted from the three-dimensional measuring apparatus (not shown), or generated by the modeling process. This function is suitable for a full-filled process of a lack portion (hole) of a shape model.

Figure 2:
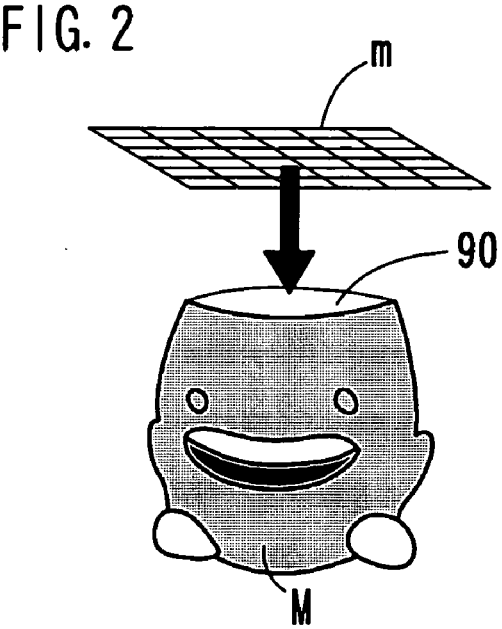
FIG. 2 is a schematic diagram for illustrating a filling process.

FIG. 2 is a schematic diagram of a filling process.

The three-dimensional data as an object for correction shown in the example is a shape model M of a mascot doll. The lack portion 90 exists in the shape model M. Namely, the mascot doll M lacks the upper side surface portion. The-filling-a-hole process is a data processing such that a grid-like plane surface m is attached on a lack portion 90, the plane surface m is modified to an appropriate curved surface corresponding to the shape model M, so as to join the curved surface to the outline of the lack portion. Thus, with the three-dimensional processing system 1, an operator (user) can fill the lack portion with the desired curved surface by a simple and easy operation.

[First Operation Example]

Figure 3A:
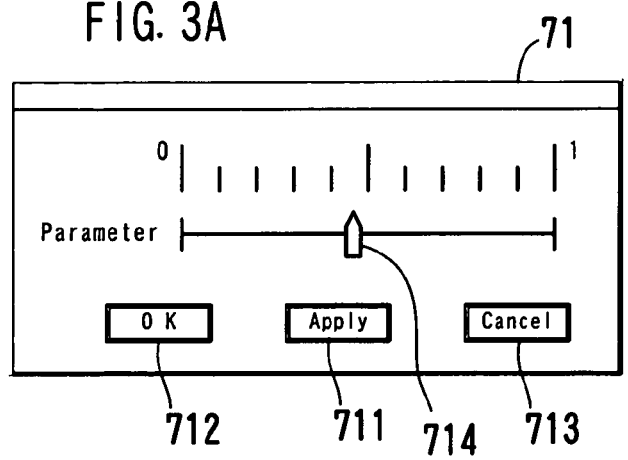
FIG. 3A is a diagram for showing a form of a dialogue of a first operation example.
Figure 3B:
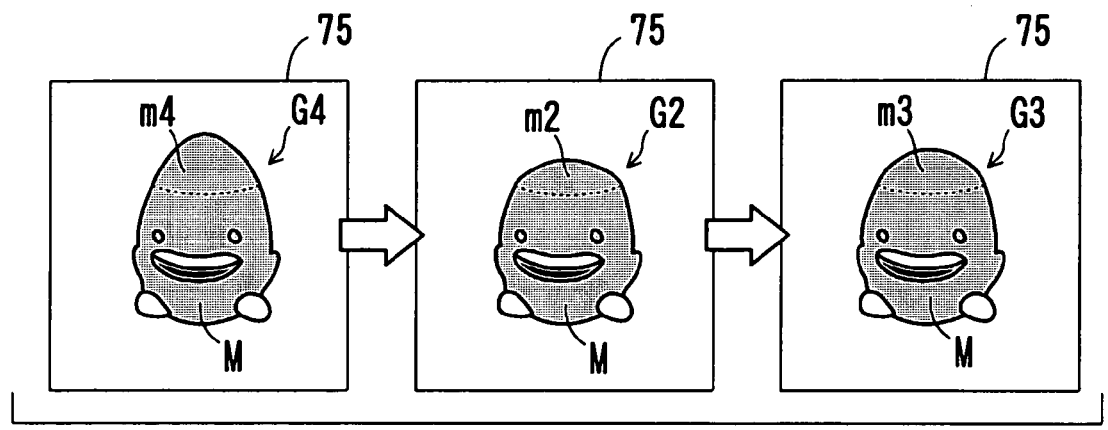
FIG. 3B is a diagram for illustrating a changing of a displayed monitor image of the first operation example.

FIGS. 3A and 3B are diagrams showing a first operation example. FIG. 3A shows a form of a dialogue window and FIG. 3B shows a changing of an image on a monitor display.

An operation sequence of the first example is as follows:

(1) In the modeling mode capable of correcting the shape model M, an operator instructs to execute filling a hole with designation of the area which contains a lack portion 90. Thus, the three-dimensional processing system 1 specifies an object of a process by detecting an outline of the lack portion 90, and displays a dialogue window 71 for querying a parameter value (coefficient γ, mentioned later) onto a screen of a display 17.

(2) The operator fixes (designates) a parameter value between a range of 0–1 by dragging a knob 714 of a slider in the dialogue window 71. Then, the operator clicks an "Apply" button 711. The three-dimensional processing system 1 performs a calculation for filling a hole, and displays an image G4 showing a result of filling on a monitor area 75 in the screen. This calculation process corresponds to a first step of the present invention and displaying of the result corresponds to a second step. The image G4 shows a condition that the curved surface m4 is positioned on the shape model M. A curvature of the curved surface m4 is defined by the parameter value.

(3) When a sufficient result could not be obtained, the operator resets appropriately the parameter value, and clicks the "Apply" button 711 again. The operator repeats this operation until the sufficient shape is obtained. In response to the modification of the parameter value, the three-dimensional processing system 1 recalculates and displays the result. This process corresponds to a third step of the present invention. In the example shown in FIG. 3B, after displaying the image G4, the parameter is modified twice in total, the displayed image is changed from the image G4 to an image G2, and further from the image G2 to an image G3, according to the modification of the parameter. Thus, by making the parameter value larger than that of the curved surface m4, the curved surface m2 having a more gentle curve than that of the surface m4 is applied, and by selecting the parameter value between the surface m4 and the surface m2, the curved surface m3 having a curve more gentle than the surface m4 and sharper than the surface m2 is applied.

Each of images G2, G3, and G4 is obtained by projecting the shape model located in the virtual space onto the screen. The operator can select a display mode such as a surface model to which a shading is applied, a wire frame model, and the like.

(4) If the sufficient result is obtained, an "OK" button 712 is clicked. Thus, the filling-a-hole process is completed. The shape model filled is stored in the auxiliary storage device 13 as the result corrected three-dimensional data.

[Second Operation Example]

Figure 4A:
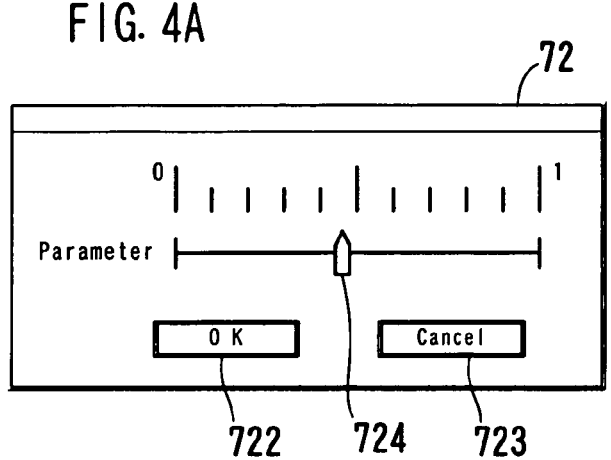
FIG. 4A is a diagram for showing a form of a dialogue of a second operation example.
Figure 4B:
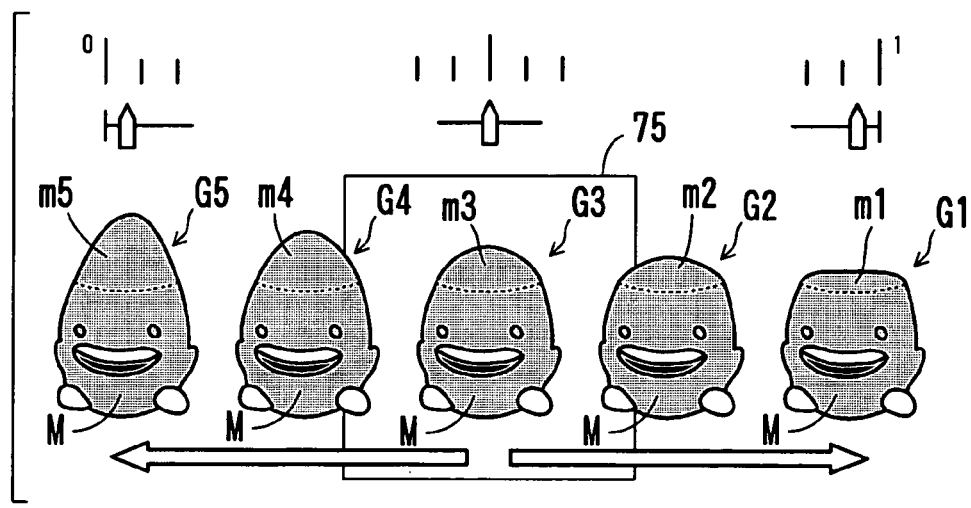
FIG. 4B is a diagram for illustrating a changing of a displayed monitor image of the second operation example.

FIGS. 4A and 4B are diagrams showing a second operation example. FIG. 4A shows a form of a dialogue window and FIG. 4B shows a changing of an image on a monitor display.

An operation sequence of the second example is as follows:

(1) In the modeling mode, an operator instructs to execute filling a hole with the designation of the area which contains a lack portion 90. Thus, the three-dimensional processing system 1 specifies an object of a process by detecting an outline of the lack portion 90, and calculates for a filling process by applying a default value of the parameter (e.g., 0.5). The three-dimensional processing system 1 displays an image G3 showing a result of the filling process on a monitor area 75 in the screen and displays a dialogue window 72 for querying whether a parameter value is appropriate.

(2) The operator can fix a parameter value between a range of 0–1 by dragging a knob 724 of a slider in the dialogue window 72. In response to dragging, the calculation for filling a hole is performed by applying the parameter value of the dragged portion, and the result images G1–5 are displayed in real time. Thus, only by operating the slider, the shape of a filled portion can be changed freely either to be flat or sharp.

(3) If the sufficient result is obtained, an "OK" button 722 is clicked. Thus, the filling-a-hole process is completed.

With such a second operation, the operation of the filling process can more rapidly proceed than the first operation. However, this operation requires that the process performances of the devices including CPU 11 are sufficiently high.

Hereinafter described the calculation for the filling process.

Figure 5A:
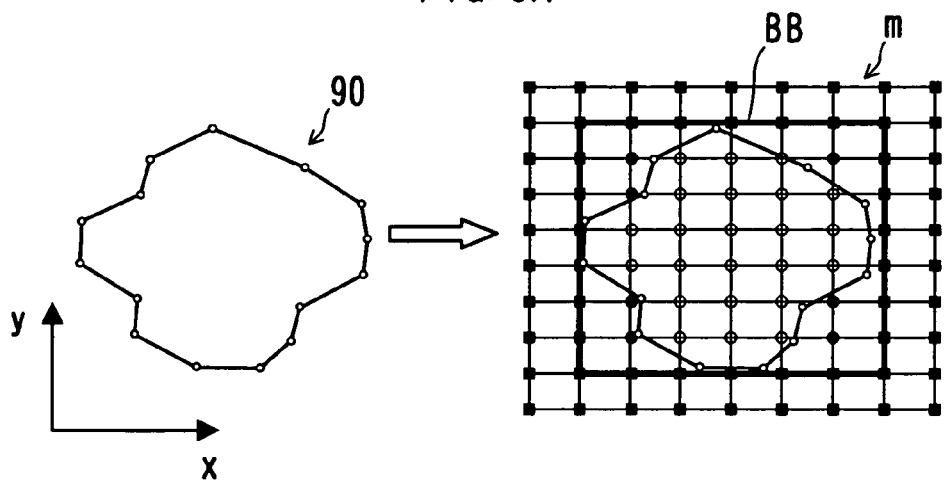
FIGS. 5A and 5B are diagram for illustrating a data processing for filling of a lack portion.

As shown in FIG. 5A, it is considered that an x-y plane along with the lack portion (hereinafter refers to as a "hole") 90 and z direction perpendicular to the x-y plane is set as the direction for attachment, plane (grid) m which is larger than the hole 90 is prepared and applied to the hole 90. Moving the grid points inside the hole 90 in the z direction generates the curved surface. When positioning of each grid point of the plane m, an influence of the position (inclination) of the data of the periphery of the hole 90 in the shape model M is considered. Therefore, the grid points are calculated to minimize a sum up to the second order differentiation among the interpolation points on the boundary condition of data position of a periphery of the hole. Thus, by changing coefficients of terms of a first order differential and a second order differential, the shape of the generated curved surface can be changed, and the filling process according to the intention of the user can be achieved.

Figure 5B:
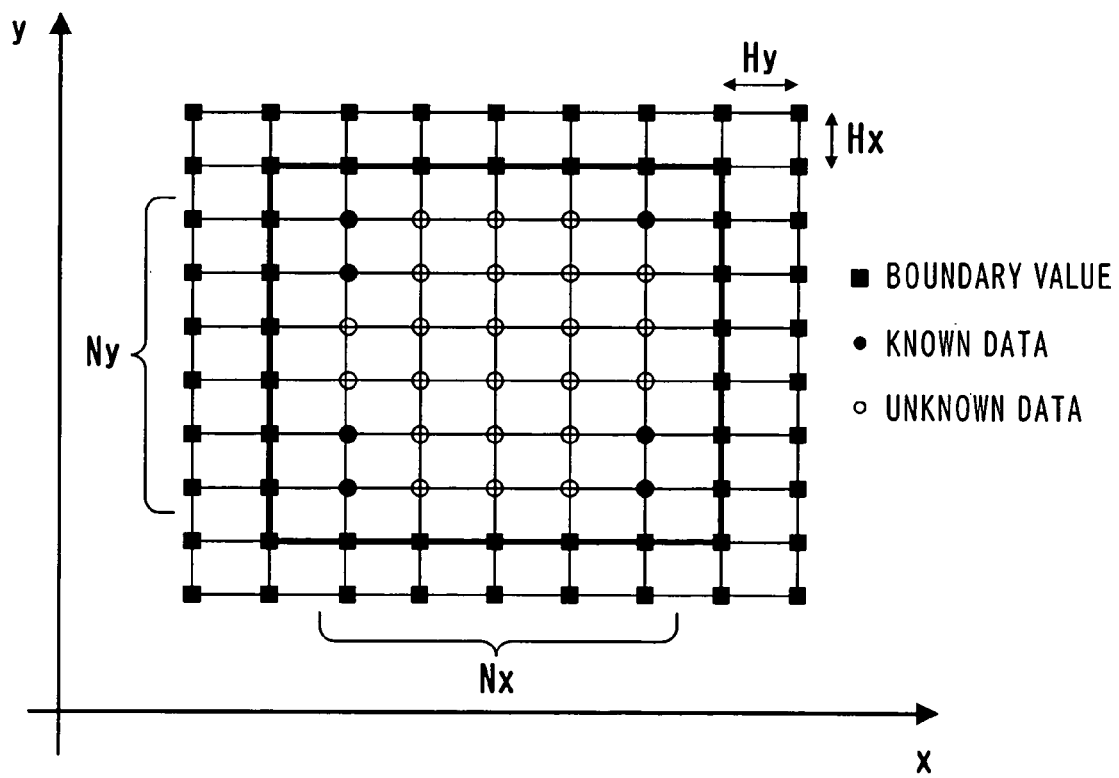

As shown with a wide frame line in FIGS. 5A and 5B, a bounding box BB is generated on the hole 90. The grid is formed within the bounding box BB and also outside of the bounding box BB the grid is formed by 1 line around it. The number of the grid point is automatically calculated from the three-dimensional data on the periphery of the hole 90. The user can also designate the number of the grid points.

The curved surface is generated by calculating the position of the grid points inside the hole 90 (white circle ○ of FIGS. 5A and 5B) in the z direction. Those grid points are unknown data. The grid points which exist inside the bounding box BB and outside the hole 90 (dark circle ● of FIGS. 5A and 5B) are known data, and those are used as boundary values for connecting the shape model M with the curved surface. The grid points outside the hole 90 on the bounding box BB (dark square ■ of FIGS. 5A and 5B) are boundary values. These boundary values can be obtained by projecting the grid points to a polygon of the shape model M.

These boundary values, known data, and unknown data are two-dimensional array as $u_{y,x}$, y=0, . . . Ny+3, x=0, . . . Nx+3 (where Nx and Ny are the number of the grid points in the x direction and y direction, respectively, inside the bounding box BB). The boundary values and the known data are already obtained. The grid intervals in the x direction and y direction are Hx and Hy, respectively.

To obtain unknown data, an energy function is determined and the unknown data can be determined to minimize the energy function.

$$E(u)=S(u)+P(u)$$

where S(u) represents the degree of less smoothness, and P(u) represents a gap from the restriction condition.

S(u) is represented by the sum of the first order differentiation and the second order differentiation, and P(u) is not considered.

Therefore:

$$S(u) = \frac{1}{2}\left\{\gamma \sum_{i}^{N_{y+2}} \sum_{j}^{N_{x+2}} [(u_{i,j}^x)^2 + (u_{i,j}^y)^2] + (1-\gamma) \sum_{i}^{N_{y+2}} \sum_{j}^{N_{x+2}} [(u_{i,j}^{xx})^2 + 2(u_{i,j}^{xy})^2 + (u_{i,j}^{yy})^2]\right\}$$ (Expression 1)

$$P(u) = 0$$

In S(u), if the coefficient γ of the first order differential term is near 1, the influence of the first order differential term becomes remarkable. Therefore, the curvature of the generated curved surface becomes small and flat. On the contrary, if the coefficient γ of the first order differential term is near 0, the influence of the second order differential term becomes remarkable. Therefore, the curvature of the generated curved surface becomes large.

Then, the $u_0$ is calculated to minimize the energy function E(u). If $u=u_0$, minimum E(u) can be obtained, $$\nabla E(u_0)=\nabla S(u_0)=0.$$

By expanding this, the primary simultaneous equation can be obtained. The unknown data is derived as a solution of the primary simultaneous equation. The curved surface can be generated by the derived unknown data. By modifying the value of γ, filling the user's desires can be achieved. By generating the curved surface using only unknown data, and connecting the generated surface with the outline of the hole 90, then the filling process is completed.

In the embodiments described above, the parameter defining the curvature corresponding to one input item can be plural (for example, independent parameters are used in the x axis direction and y axis direction). The graphical user interface for modifying the operation of the parameter is not limited to slider and thus a dial-like member can be used.

According to the embodiments described above, desired curved surface can be added to a part of the shape model by the simple and easy operation.

What is claimed is:

1. A processing method to be implemented by a computer, comprising the steps of:
   obtaining three-dimensional shape data representing a three-dimensional shape model of an actual object;
   receiving a designation of an omitted portion of the three-dimensional shape model, the omitted portion being included in the obtained three-dimensional shape data and being a portion where original three-dimensional shape data representing the actual object is omitted;
   displaying the three-dimensional shape model and a curved surface model to be joined to the designated omitted portion, a shape of the curved surface model being defined by one parameter;
   modifying a shape of the curved surface model so as to fit to the three-dimensional shape model by changing the parameter value; and displaying the modified curved surface model with conforming to the omitted portion of the three-dimensional shape model.

2. The method according to claim 1, wherein the surface is displayed on the designated portion together with the three-dimensional shape model.

3. The method according to claim 1, wherein the alteration of a parameter is executed by a manual operation of a user and the altered parameter is applied to a modification in the modifying step.

4. The method according to claim 1, wherein the alteration of a parameter is performed manually by a single operation of a user for fixing the parameter to be applied to a modification in the modifying step.

5. The method according to claim 1, wherein the shape of the surface corresponds to a shape of the designated portion with regard to any altered parameter.

6. The method according to claim 1, wherein the shape of the surface is determined based on a data which represents a periphery of the designated portion in the three-dimensional shape model.

7. The method according to claim 1, wherein the surface contains a plurality of points having a fixed position with reference to the X-axis direction and Y-axis direction, and
   the modifying step includes modifying a position with reference to the Z-axis direction of at least one of the plurality of points based on the altered parameter.

8. The method according to claim 7, wherein the modifying step includes determining a position with reference to the Z-axis direction of at least one of the plurality of points so as to minimize a sum up to the second order differentiation among the plurality of points on the boundary condition of three-dimensional shape data of a periphery of the designated portion.

9. The method according to claim 8, wherein a first order differential coefficient and a second order differential coefficient of the second order differentiation are positive numbers and a sum of them is equal to 1, and the parameter is one of the first order differential coefficient on the second order differential coefficient.

10. A computer program product comprising a computer usable medium having encoded thereon a computer readable program for processing a three-dimensional shape model by making a computer system execute each step described in claim 1.

11. A computer program product comprising a computer usable medium having encoded thereon a computer readable program for processing a three-dimensional shape model by making a computer system execute each step described in claim 2.

12. A computer program product comprising a computer usable medium having encoded thereon a computer readable program for processing a three-dimensional shape model by making a computer system execute each step described in claim 3.

13. A computer program product comprising a computer usable medium having encoded thereon a computer readable program for processing a three-dimensional shape model by making a computer system execute each step described in claim 4.

14. A processing method of a three-dimensional shape data, comprising the steps of:
 displaying a three-dimensional shape model having a portion of original three-dimensional shape data omitted and a curved surface model to be joined to the three-dimensional shape model at a portion corresponding to where the portion of original three-dimensional shape data has been omitted, a shape of the curved surface model being defined by at least one parameter;
 obtaining only one parameter value that is instructed to be changed by an operator; and
 modifying the shape of the displayed curved surface model based on the obtained parameter value.

15. The method according to claim 14, wherein, wherein
 the obtaining of a parameter value is performed manually by a manual operation of a user for fixing the parameter value, and by a manual operation of a user for applying the fixed parameter value onto a modification.

16. The method according to claim 14, wherein, wherein
 the obtaining of a parameter value is performed manually by a manual operation of a user for fixing the parameter value, and applying the fixed parameter value onto a modification is not necessary.

17. A processing system of a three-dimensional shape data, comprising:
 a display device for displaying a three-dimensional shape model having a portion of original three-dimensional shape data omitted and a curved surface model to be joined to the three-dimensional shape model at a portion corresponding to where the portion of original three-dimensional shape data has been omitted, a shape of the curved surface model being defined by at least one parameter;
 a setting portion for obtaining only one parameter value that is instructed to be changed by an operator; and
 a modifying portion for modifying the shape of the displayed curved surface model based on the obtained parameter value.

18. The processing system according to claim 17, wherein, wherein
 the obtaining of a parameter value is performed manually by a manual operation of a user for fixing the parameter value, and by a manual operation of a user for applying the fixed parameter value onto a modification.

19. The processing system according to claim 17, wherein, wherein
 the obtaining of a parameter value is performed manually by a manual operation of a user for fixing the parameter value, and applying the fixed parameter value onto a modification is not necessary.

* * * * *